(12) United States Patent
Kanno et al.

(10) Patent No.: US 7,585,587 B2
(45) Date of Patent: Sep. 8, 2009

(54) SEPARATOR FOR NON-AQUEOUS ELECTROLYTE CELL

(75) Inventors: Hiroshi Kanno, Kodaira (JP); Masashi Otsuki, Kodaira (JP); Shinichi Eguchi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 780 days.

(21) Appl. No.: 10/540,837

(22) PCT Filed: Dec. 19, 2003

(86) PCT No.: PCT/JP03/16360

§ 371 (c)(1),
(2), (4) Date: Jun. 27, 2005

(87) PCT Pub. No.: WO2004/062002

PCT Pub. Date: Jul. 22, 2004

(65) Prior Publication Data

US 2006/0073381 A1    Apr. 6, 2006

(30) Foreign Application Priority Data

Dec. 27, 2002    (JP) .............................. 2002-380683

(51) Int. Cl.
*H01M 2/16* (2006.01)
*H01M 6/18* (2006.01)
*H01M 6/04* (2006.01)
*H01M 4/60* (2006.01)

(52) U.S. Cl. ............... 429/142; 429/254; 429/304; 429/306; 429/188; 429/212; 252/62.2

(58) Field of Classification Search .............. 429/129, 429/254
See application file for complete search history.

(56) References Cited

U.S. PATENT DOCUMENTS 6,416,905 B1    7/2002    Bronstert et al.

FOREIGN PATENT DOCUMENTS

| EP | 1 236 759 A | 9/2002 |
|---|---|---|
| JP | WO 01/91219 A1 * | 11/2001 |
| JP | 2002-194133 A | 7/2002 |
| JP | 2002-194134 A | 7/2002 |
| JP | 2002-256093 * | 9/2002 |
| JP | 2002-256093 A | 9/2002 |
| WO | WO 01/86746 A1 | 11/2001 |
| WO | WO 02/21629 A1 | 3/2002 |

OTHER PUBLICATIONS

Patent Abstracts of Japan, vol. 2002, No. 11, Nov. 6, 2002 (corresponds to JP 2002-194134 A, published Jul. 10, 2002 to Nitto Denko Corporation).

* cited by examiner

*Primary Examiner*—Dah-Wei D Yuan
*Assistant Examiner*—Kwang Han
(74) *Attorney, Agent, or Firm*—Sughrue Mion, PLLC

(57) ABSTRACT

The invention relates to an incombustible separator for a non-aqueous electrolyte cell in which the separator itself does not burn even if the temperature inside the cell becomes high, and more particularly to a separator for a non-aqueous electrolyte cell made of a microporous film formed by a phosphazene derivative and/or an isomer of a phosphazene derivative to a polymer.

3 Claims, No Drawings

SEPARATOR FOR NON-AQUEOUS ELECTROLYTE CELL

TECHNICAL FIELD

This invention relates to a separator for non-aqueous electrolyte cell, and more particularly to an incombustible separator for non-aqueous electrolyte cell.

BACKGROUND ART

Recently, cells being small-size and light-weight and having a long service life and a high energy density are demanded as a power source for small-size electron devices with the rapid advance of the electronics. The non-aqueous electrolyte cells containing lithium as a negative electrode active substance have been known as one of the cells having a high energy density because an electrode potential of lithium is lowest among metals and an electric capacity per unit volume is large. Many kinds of them are actively studied irrespectively of primary cell and secondary cell, a part of which is put into practical use and supplied to markets. For example, the non-aqueous electrolyte primary cells are used as a power source for camera, electron watch and various memory backups, while the non-aqueous electrolyte secondary cells are used as a driving power source for note-type personal computer, mobile-phones and the like.

At the present days, a porous film of a polyolefin such as polyethylene, polypropylene or the like is used in a separator arranged between a positive electrode and a negative electrode in these non-aqueous electrolyte cells for preventing the short-circuiting between the positive and negative electrodes. In the separator are formed many pores for passing ion in the charge and discharge of the cell, so that the passing of the ion is not obstructed under the usual use environment.

In the non-aqueous electrolyte cell, lithium as a negative electrode active substance violently reacts with a compound having an active proton such as water, alcohol or the like, so that a combustible aprotic organic solvent is used in the electrolyte of the cell. However, the aprotic organic solvent has a drawback that a risk of fire-ignition is high. For this end, the separator for the non-aqueous electrolyte cell has a function that when the temperature in the cell rises to 130-150° C. or more due to the flowing of an abnormal current based on accidental short-circuiting or the like, the pores in the separator are closed by fusing the separator itself to prevent the passing of the ion between the positive and negative electrodes or shut off the current to stop the rise of the temperature (shut-down effect), which reduces the risk of firing and igniting the aprotic organic solvent in the electrolyte (see JP-A-8-138644).

DISCLOSURE OF THE INVENTION

However, if the temperature in the cell becomes further higher than 150° C., there is a possibility that the separator itself combusts. In this case, the rise of the temperature in the non-aqueous electrolyte cell is promoted to cause a risk of causing thermal runaway of the non-aqueous electrolyte cell.

It is, therefore, an object of the invention to provide an incombustible separator for a non-aqueous electrolyte cell in which the separator itself never combusts even if the temperature in the cell becomes higher.

The inventors have made studies in order to achieve the above object and found that a separator made from a polymer added with a phosphazene derivative and/or an isomer of a phosphazene derivative does not combust even at a higher temperature, and as a result, the invention has been accomplished.

That is, the separator for the non-aqueous electrolyte cell according to the invention comprises a microporous film formed by adding a phosphazene derivative and/or an isomer of a phosphazene derivative to a polymer.

In a preferable embodiment of the separator for the non-aqueous electrolyte cell according to the invention, a total amount of the phosphazene derivative and/or the isomer of the phosphazene derivative added to 100 parts by mass of the polymer is 0.5-10 parts by mass.

As the phosphazene derivative is preferable a phosphazene derivative having a viscosity at 25° C. of not more than 300 mPa·s (300 cP) and represented by the following formula (I) or (II):

(wherein $R^1$, $R^2$ and $R^3$ are independently a monovalent substituent or a halogen element; $X^1$ is a substituent containing at least one element selected from the group consisting of carbon, silicon, germanium, tin, nitrogen, phosphorus, arsenic, antimony, bismuth, oxygen, sulfur, selenium, tellurium and polonium; and $Y^1$, $Y^2$ and $Y^3$ are independently a bivalent connecting group, a bivalent element or a single bond)

(wherein $R^4$ is independently a monovalent substituent or a halogen element; and n is 3-15).

Among the phosphazene derivatives of the formula (II) is particularly preferable a phosphazene derivative represented by the following formula (III) or (IV):

(wherein n is 3-13)

(wherein $R^5$ is independently a monovalent substituent or fluorine, and at least one of all $R^5$s is a fluorine containing monovalent substituent or fluorine; and n is 3-8, provided that all $R^5$s are not fluorine).

As the phosphazene derivative is preferable a phosphazene derivative being a solid at 25° C. and represented by the following formula (V):

(wherein $R^6$ is independently a monovalent substituent or a halogen element; and n is 3-6).

As the isomer of the phosphazene derivative is an isomer represented by the following formula (VI) and of a phosphazene derivative represented by the following formula (VII):

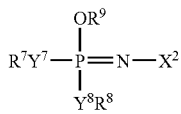

(VII)

(in the formulae (VI) and (VII), $R^7$, $R^8$ and $R^9$ are independently a monovalent substituent or a halogen element; $X^2$ is a substituent containing at least one element selected from the group consisting of carbon, silicon, germanium, tin, nitrogen, phosphorus, arsenic, antimony, bismuth, oxygen, sulfur, selenium, tellurium and polonium; and $Y^7$ and $Y^8$ are independently a bivalent connecting group, a bivalent element or a single bond).

In the other preferable embodiment of the separator for the non-aqueous electrolyte cell according to the invention, the polymer is a polyolefin. The polyolefin is particularly preferable to be polyethylene or polypropylene.

BEST MODE FOR CARRYING OUT THE INVENTION

The invention will be described in detail below. The separator for the non-aqueous electrolyte cell according to the invention is a microporous film formed by adding a phosphazene derivative and/or an isomer of a phosphazene derivative to a polymer. The reason why the separator for the non-aqueous electrolyte cell according to the invention is made from the polymer added with the phosphazene derivative and/or the isomer of the phosphazene derivative is as follows. That is, when the phosphazene derivative and/or the isomer of the phosphazene derivative is existent in the separator, the separator becomes incombustible under the action of nitrogen gas, phosphoric acid ester or the like derived from the phosphazene derivative and the isomer thereof, and hence the risk of burning the separator itself is reduced. Also, the halogen (e.g. fluorine) containing phosphazene derivative and the isomer thereof act as an agent for catching active radical in the accidental combustion, while the phosphazene derivative and the isomer thereof having the organic substituent have an effect of shutting off oxygen because a carbide (char) is formed on the electrode material and the separator in the accidental combustion. Furthermore, phosphorus has an action of controlling the chain decomposition of the polymer as a starting material for the separator, so that the risk of burning the separator can be effectively reduced.

As the phosphazene derivative and the isomer thereof, it is preferable to have a halogen element containing substituent in their molecular structure. As the halogen element, fluorine, chlorine, bromine and the like are preferable, and fluorine is particularly preferable. When the halogen element containing substituent is existent in the molecular structure, even if the total amount of the phosphazene derivative and the isomer thereof added is small, it is possible to more effectively develop the incombustibility in the separator through the derived halogen gas. In the compound having the halogen element containing substituent, there may be caused a problem of generating halogen radical, but the phosphazene derivative and the isomer thereof do not cause such a problem because phosphorus element in the molecular structure catches the halogen radical to form a stable phosphorus halide.

The content of the halogen element in the phosphazene derivative and the isomer thereof is preferably not less than 2% by mass, more preferably 2-80% by mass, further preferably 2-60% by mass, and particularly 2-50% by mass. When the content is less than 2% by mass, the effect by including the halogen element may be not developed sufficiently. As the halogen element, fluorine, chlorine, bromine and the like are preferable, and fluorine is particularly preferable.

As the phosphazene derivative is preferable a phosphazene derivative having a viscosity at 25° C. of not more than 300 mPa·s (300 cP), preferably not more than 5 mPa·s (5 cP) and represented by the formula (I) or (II).

In the formula (I), $R^1$, $R^2$ and $R^3$ are not particularly limited as long as they are a monovalent substituent or a halogen element. As the monovalent substituent are mentioned an alkoxy group, a phenoxy group, an alkyl group, a carboxyl group, an acyl group, an aryl group, an alkylthio group and the like. Among them, the alkoxy group is particularly preferable in a point that it is low in the viscosity. On the other hand, as the halogen element are preferably mentioned fluorine, chlorine, bromine and the like. All of $R^1$-$R^3$ may be the same substituent, or some of them may be different kinds of substituents.

As the alkoxy group are mentioned, for example, methoxy group, ethoxy group, propoxy group, butoxy group and the like, or an alkoxy-substituted alkoxy group such as methoxyethoxy group, methoxyethoxyethoxy group or the like. Among them, all of $R^1$-$R^3$ are preferable to be methoxy group, ethoxy group, methoxyethoxy group or methoxyethoxyethoxy group, and particularly methoxy group or ethoxy group is preferable in a point that the viscosity is low.

As the alkyl group are mentioned methyl group, ethyl group, propyl group, butyl group, pentyl group and the like. As the acyl group are mentioned formyl group, acetyl group, propionyl group, butyryl group, isobutyryl group, valeryl group and the like. As the aryl group are mentioned phenyl group, tolyl group, naphthyl group and the like. As the alkylthio group are mentioned methylthio group, ethylthio group, phenylthio group and the like.

In these monovalent substituents, hydrogen element is preferable to be substituted with a halogen element. As the halogen element are preferably mentioned fluorine, chlorine, bromine and the like.

As the bivalent connecting group shown by $Y^1$, $Y^2$ and $Y^3$ in the formula (I) are mentioned, for example, $CH_2$ group and a bivalent connecting group containing at least one element selected from the group consisting of oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among them, $CH_2$ group and the bivalent connecting group containing at least one element selected from the group consisting of oxygen, sulfur, selenium and nitrogen are preferable. Also, $Y^1$, $Y^2$ and $Y^3$ may be a bivalent element such as oxygen, sulfur, selenium or the like, or a single bond. In a point that the safety of the separator is considerably improved, the bivalent connecting group containing sulfur and/or selenium, sulfur element and selenium element are particularly preferable. All of $Y^1$-$Y^3$ may be the same kind, or some of them may be different kinds.

In the formula (I), $X^1$ is preferable to be an organic group containing at least one element selected from the group consisting of carbon, silicon, nitrogen, phosphorus, oxygen and sulfur from a viewpoint of the care for toxicity, environment and the like. As the organic group is preferable an organic group having a structure represented by the following formula (VIII), (IX) or (X):

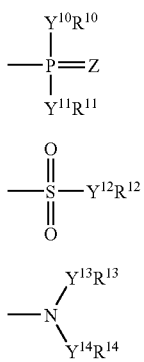

$$\begin{array}{c} Y^{10}R^{10} \\ | \\ -P=Z \\ | \\ Y^{11}R^{11} \end{array} \quad \text{(VIII)}$$

$$\begin{array}{c} O \\ \| \\ -S-Y^{12}R^{12} \\ \| \\ O \end{array} \quad \text{(IX)}$$

$$-N\begin{array}{c} Y^{13}R^{13} \\ \diagup \\ \diagdown \\ Y^{14}R^{14} \end{array} \quad \text{(X)}$$

In the formulae (VIII), (IX) and (X), $R^{10}$-$R^{14}$ are a monovalent substituent or a halogen element. $Y^{10}$-$Y^{14}$ are a bivalent connecting group, a bivalent element or a single bond, and Z is a bivalent group or a bivalent element.

As $R^{10}$-$R^{14}$ in the formulae (VIII), (IX) and (X) are preferably mentioned the same monovalent substituents or halogen elements as described on $R^1$-$R^3$ in the formula (I). Also, they may be the same kind or different kinds in the same organic group. Further, $R^{10}$ and $R^{11}$ in the formula (VIII), and $R^{13}$ and $R^{14}$ in the formula (X) may be bonded to each other to form a ring.

As the group shown by $Y^{10}$-$Y^{14}$ in the formulae (VIII), (IX) and (X) are mentioned the same bivalent connecting groups, bivalent elements and the like as described on $Y^1$-$Y^3$ in the formula (I). Similarly, the group containing sulfur and/or selenium is particularly preferable because the risk of burning the separator is reduced. They may be the same kind or different kinds in the same organic group.

As Z in the formula (VIII) are mentioned, for example, $CH_2$ group, CHR group (R is an alkyl group, an alkoxyl group, a phenyl group or the like, and it is same as above), NR group, and a bivalent group containing at least one element selected from the group consisting of oxygen, sulfur, selenium, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron cobalt and nickel. Among them, $CH_2$ group, CHR group, NR group and bivalent group containing at least one element selected from the group consisting of oxygen, sulfur and selenium are preferable. Particularly, the bivalent group containing sulfur and/or selenium is preferable because the risk of burning the separator is reduced. Also, Z may be a bivalent element such as oxygen, sulfur, selenium or the like.

As the organic group is particularly preferable a phosphorus-containing organic group as represented by the formula (VIII) in a point that the risk of burning the separator can be effectively reduced.

In the formula (II), $R^4$ is not particularly limited as long as it is a monovalent substituent or a halogen element. As the monovalent substituent are mentioned an alkoxy group, a phenoxy group, an alkyl group, a carboxyl group, an acyl group, an aryl group, an alkylthio group and the like. Among them, the alkoxy group, phenoxy group and the like are particularly preferable. On the other hand, fluorine, chlorine, bromine and the like are preferably mentioned as the halogen element. As the alkoxy group are preferably mentioned methoxy group, ethoxy group, methoxyethoxy group, propoxy group and the like. Among them, methoxy group, ethoxy group and methoxyethoxy group are particularly preferable. In these substituents, hydrogen element is preferable to be substituted with a halogen element, and fluorine, chlorine, bromine or the like is preferably mentioned as the halogen element.

It is possible to synthesize phosphazene derivatives having a more preferable viscosity, a solubility suitable for addition-mixing and the like by properly selecting $R^1$-$R^4$, $R^{10}$-$R^{14}$, $Y^1$-$Y^3$, $Y^{10}$-$Y^{14}$ and Z in the formulae (I), (II), (VIII)-(X). These phosphazene derivatives may be used alone or in a combination of two or more.

Among the phosphazene derivatives of the formula (II), a phosphazene derivative represented by the formula (III) is particularly preferable. In the formula (III), n is preferably 3-4, more preferably 3. When the value of n is small, the boiling point is low and hence the ignition preventing property in the approaching to a flame can be improved. On the other hand, as the value of n becomes large, the boiling point becomes higher, and hence it can be stably used even at a high temperature. In order to obtain target performances by utilizing the above property, it is possible to properly select and use a plurality of phosphazene derivatives.

Also, a phosphazene derivative represented by the formula (IV) is preferable as the phosphazene derivative of the formula (II). As the monovalent substituent in the formula (IV) are mentioned an alkoxy group, an alkyl group, an acyl group, an aryl group, a carboxyl group, an alkylthio group and the like, and the alkoxy group is preferable in a point that the risk of burning the separator can be reduced effectively. As the alkoxy group are mentioned methoxy group, ethoxy group, n-propoxy group, i-propoxy group, butoxy group and the like, or an alkoxy group-substituted alkoxy group such as methoxyethoxy group or the like, and methoxy group, ethoxy group and n-propoxy group are particularly preferable in a point that the risk of burning the separator can be surely reduced. In the formula (IV), n is preferable to be 3-4 in a point that the risk of burning the separator can be reduced effectively. The monovalent substituent is preferable to be substituted with fluorine, and if all of $R^5$s in the formula (IV) are not fluorine, at least one monovalent substituent contains fluorine. The content of fluorine in the phosphazene derivative of the formula (IV) is preferably 3-70% by mass, more preferably 7-45% by mass.

As the phosphazene derivative is preferable a phosphazene derivative being solid at 25° C. (room temperature) and represented by the formula (V). In the formula (V), $R^6$ is not particularly limited as long as it is a monovalent substituent or a halogen element. As the monovalent substituent are mentioned an alkoxy group, an alkyl group, a carboxyl group, an acyl group, an aryl group and the like, and among them the alkoxygroup is preferable. As the halogen element are preferably mentioned fluorine, chlorine, bromine, iodine and the like. As the alkoxy group are preferable methoxy group, ethoxy group, methoxyethoxy group, propoxy group (isopropoxy group, n-propoxy group), phenoxy group, trifluoroethoxy group and the like, and methoxy group, ethoxy group, propoxy group (isopropoxy group, n-propoxy group), phenoxy group, trifluoroethoxy group and the like are more preferable. The monovalent substituent is preferable to contain the above halogen element. In the formula (V), n is particularly preferable to be 3 or 4.

As the phosphazene derivative of the formula (V) are particularly preferable a structure of the formula (V) wherein $R^6$ is methoxy group and n is 3, a structure of the formula (V) wherein $R^6$ is either of methoxy group and phenoxy grou p and n is 4, a structure of the formula (V) wherein $R^6$ is ethoxy group and n is 4, a structure of the formula (V) wherein $R^6$ is isopropoxy group and n is 3 or 4, a structure of the formula (V) wherein $R^6$ is n-propoxy group and n is 4, a structure of the formula (V) wherein $R^6$ is trifluoroethoxy group and n is 3 or 4, and a structure of the formula (V) wherein $R^6$ is phenoxy group and n is 3 or 4.

As the isomer of the phosphazene derivative is preferable an isomer represented by the formula (VI) and of a phosphazene derivative represented by the formula (VII). In the formula (VI), $R^7$, $R^8$ and $R^9$ are not particularly limited as long as they are a monovalent substituent or a halogen element, and preferably include the same monovalent substituents or halogen elements as described on $R^1$-$R^3$ in the formula (I). Also, as the bivalent connecting group or bivalent element shown by $Y^7$ and $Y^8$ in the formula (VI) are preferably mentioned the same bivalent connecting groups or bivalent elements as described on $Y^1$-$Y^3$ in the formula (I). Furthermore, as the substituent shown by $X^2$ in the formula (VI) are preferably mentioned the same substituents as described on $X^1$ in the formula (I).

The isomer of the formula (VI) is an isomer of a phosphazene derivative represented by the formula (VII), and can be produced, for example, by adjusting a vacuum degree and/or a temperature in the production of the phosphazene derivative of the formula (VII). The content of the isomer (volume %) can be measured by the following measuring method.

<Measuring Method>

It can be measured by finding a peak area of a sample through a gel permeation chromatography (GPC) or a high-speed liquid chromatography, comparing the found peak area with a previously found area per mole of the isomer to obtain a molar ratio, and further converting into a volume while considering a specific gravity.

As the phosphazene derivative of the formula (VII), it is preferable to have a relatively low viscosity. As $R^7$-$R^9$, $Y^7$-$Y^8$ and $X^2$ in the formula (VII) are preferably mentioned the same as described on $R^7$-$R^9$, $Y^7$-$Y^8$ and $X^2$ in the formula (VI).

The flash point of the phosphazene derivative and the isomer thereof is not particularly limited, but it is preferably not lower than 100° C., more preferably not lower than 150° C., further preferably not lower than 230° C. from a viewpoint of the suppression of the combustion of the separator, and no ignition is most preferable. The term "flash point" used herein means such a temperature that a flame is broadened on a surface of a substance and covers at least 75% of the surface of the substance. The flash point is a scale looking a tendency of forming a combustible mixture with air. When the phosphazene derivative and the isomer thereof have a flash point of not lower than 100° C., it is possible to effectively reduce the risk of burning the separator.

As the polymer to be added with the phosphazene derivative and/or the isomer of the phosphazene derivative are mentioned a polyolefin such as polyethylene, polypropylene or the like; a polyester such as polybutylene terephthalate, polyethylene terephthalate, polycarbonate or the like; a styrene-based resin such as polystyrene, ABS resin or the like; a polyvinyl chloride based resin, a polyacetal, a polyether such as polyphenylene ether or the like; a sulfur-containing polymer such as polyphenylene sulfide, polyether sulfon, polysulfon or the like; a polyimide-based polymer such as polyimide, polyamideimide, polyether imide or the like; a ketone-based polymer such as polyetherether ketone or the like; a polyamide, a fluorine resin such as polytetrafluoroethylene or the like; a cellulose-based material and so on. Among them, the polyolefin is preferable from a viewpoint of chemical stability such as resistance to solvent or the like and mechanical strength such as tensile strength, bending strength or the like. Also, the shape of the separator may be sheet, film or non-woven fabric.

The total amount of the phosphazene derivative and the isomer of the phosphazene derivative added to the polymer is 0.5-10 parts by mass, preferably 1-5 parts by mass per 100 parts by mass of the polymer from a viewpoint of effectively reducing the risk of burning the separator. When the total amount of the phosphazene derivative and the isomer of the phosphazene derivative is less than 0.5 part by mass, the effect of reducing the risk of burning the separator is small, while when it exceeds 10 parts by mass, the mechanical strength of the separator in the production of the separator lowers.

The separator for the non-aqueous electrolyte cell according to the invention is a microporous film, and does not obstruct substantially the passing of ion in the charge-discharge of the cell likewise the conventional separator for the non-aqueous electrolyte cell. In the separator for the non-aqueous electrolyte cell according to the invention, the pore diameter is 0.005-5 μm, preferably 0.01-1 μm. Also, the thickness of the separator for the non-aqueous electrolyte cell according to the invention is properly selected in accordance with the mechanical strength required for the separator, and is 5-100 μm, preferably 7-40 μm. Furthermore, the porosity of the separator for the non-aqueous electrolyte cell according to the invention is properly selected in accordance with the permeability and liquid-holding property of the target non-aqueous electrolyte, and is 25-60%, preferably 35-50%.

The separator for the non-aqueous electrolyte cell according to the invention can be produced by the conventional production method of the separator for the non-aqueous electrolyte cell. For example, there can be exemplified a dry process and a wet process as mentioned below. In the dry process, the polymer is fused by heating at a first step, and the phosphazene derivative and/or the isomer of the phosphazene derivative are added to the fused polymer and mixed to form a homogeneous mass. In this case, the heating temperature is properly selected in accordance with the melting point of the polymer used. At a second step, the resulting mixture is extruded into a film through an extruder, annealed and drawn through a drawing machine at a low temperature to form pores of an initial stage. At a third step, the film having the pores of initial stage is drawn through a drawing machine at a high temperature to form a microporous film.

On the other hand, in the wet process, the polymer and the phosphazene derivative and/or the isomer of the phosphazene derivative are mixed and fused by heating at a first step. At a second step, the resulting mixture is extruded into a film through an extruder and further drawn in a uniaxial direction or a biaxial direction through a drawing machine. At a third step, the solvent used in the first step is extracted from the drawn film with a volatile solvent and further the film is dried in air to form a microporous film.

As a plasticizer for the polymer are used ones having a good affinity with the polymer and not evaporating in the melt kneading or shaping. For example, when a ultrahigh-molecular weight polyethylene is used as a base polymer, there can be used various known plasticizers as long as they have a boiling point higher than the melting point of the ultrahigh-molecular weight polyethylene. Concretely, there may be mentioned, for example, a paraffin wax being solid at room temperature, a higher aliphatic alcohol such as stearyl alcohol, ceryl alcohol or the like; n-alkane being liquid at room temperature such as n-decane, n-dodecane or the like; liquid paraffin, kerosene and so on. The use ratio of the base polymer and the plasticizer is usually selected from such a range that the ultrahigh-molecular weight polyethylene is 5-60% by mass, preferably 10-50% by mass and the plasticizer is 40-95% by mass, preferably 50-90% by mass. Also, a known antioxidant or the like may be used together with the resin composition in an amount of 0.01-5% by mass to the resin composition.

A non-aqueous electrolyte cell using the separator for non-aqueous electrolyte cell according to the invention comprises the separator of the invention, a positive electrode, a negative electrode and an electrolyte, and may be a primary cell or a secondary cell.

As the positive electrode of the non-aqueous electrolyte primary cell are preferably mentioned a fluorinated graphite $[(CF_x)_n]$, $MnO_2$ (may be synthesized chemically or electrochemically), $V_2O_5$, $MoO_3$, $Ag_2CrO_4$, $CuO$, $CuS$, $FeS_2$, $SOCl_2$, $TiS_2$ and the like. Among them, $MnO_2$, $V_2O_5$ and fluorinated graphite are preferable in a point that they are high in the capacity, safe, high in the discharge potential and excellent in the wettability to the electrolyte, and $MnO_2$ and $V_2O_5$ are more preferable in a point of the cost. As the positive electrode for the non-aqueous electrolyte secondary cell are preferably mentioned a metal oxide such as $V_2O_5$, $V_6O_{13}$, $MnO_2$, $MnO_3$ or the like; a lithium-containing composite oxide such as $LiCoO_2$, $LiNiO_2$, $LiMn_2O_4$, $LiFeO_2$, $LiFePO_4$ or the like; a metal sulfide such as $TiS_2$, $MoS_2$ or the like; an electrically conductive polymer such as polyaniline or the like; and so on. The lithium-containing composite oxide may be a composite oxide containing two or three transition metals selected from the group consisting of Fe, Mn, Co and Ni, and in this case, the composite oxide is represented by $LiFe_xCo_yNi_{(1-x-y)}O_2$ (wherein $0 \leq x<1$, $0 \leq y<1$, $0<x+y \leq 1$) or $LiMn_xFe_yO_{2-x-y}$. Among them, $LiCoO_2$, $LiNiO_2$, $LiMn_2O_4$ are particularly preferable in a point that the capacity is high, the safety is high and further the wettability to the electrolyte is excellent. These materials may be used alone or in a combination of two or more. The positive electrode may be mixed with an electric conducting agent and a binding agent, if necessary. As the electric conducting agent are mentioned acetylene black and the like, and as the binding agent are mentioned polyvinylidene fluoride (PVDF), polytetrafluoroethylene (PTFE) and the like. The form of the positive electrode is not particularly limited and can be properly selected from the conventionally known forms as an electrode. For example, there are mentioned sheet, column, plate, spiral form and the like.

As the negative electrode for the non-aqueous electrolyte primary cell are mentioned, for example, lithium metal itself, lithium alloy and the like. As a metal to be alloyed with lithium are mentioned Sn, Pb, Al, Au, Pt, In, Zn, Cd, Ag, Mg and the like. Among them, Al, Zn and Mg are preferable from a viewpoint of large amount of deposit and toxicity. As the negative electrode for the non-aqueous electrolyte secondary cell are preferably mentioned lithium metal itself, an alloy of lithium with Al, In, Pb, Zn or the like, a carbon material such as graphite doped with lithium, and the like. Among them, the carbon material such as graphite or the like is preferable in a point that the safety is higher. These materials may be used alone or in a combination of two or more. The form of the negative electrode is not particularly limited and can be properly selected from the known forms likewise the form of the positive electrode.

The electrolyte is composed mainly of a support salt and an aprotic organic solvent. As the support salt are ones usually used as an ion source for lithium ion, which preferably include lithium salts such as $LiClO_4$, $LiBF_4$, $LiPF_6$, $LiCF_3SO_3$, $LiAsF_6$, $LiC_4F_9SO_3$, $Li(CF_3SO_2)_2N$, $Li(C_2F_5SO_2)_2N$ and the like. They may be used alone or in a combination of two or more.

The aprotic organic solvent is not particularly limited, but includes ether compounds, ester compounds and the like from a viewpoint that the viscosity of the electrolyte is controlled to a low level. Concretely, there are mentioned 1,2-dimethoxyethane, tetrahydrofuran, dimethyl carbonate, diethyl carbonate, diphenyl carbonate, ethylene carbonate, propylene carbonate, γ-butyrolactone, γ-valerolactone, methylethyl carbonate, ethylmethyl carbonate and the like. Among them, a cyclic ester compound such as propylene carbonate, γ-butyrolactone or the like, a chain ester compound such as dimethyl carbonate, methylethyl carbonate or the like, and a chain ether compound such as 1,2-dimethoxyethane or the like are preferable in case of using in the non-aqueous electrolyte primary cell, and a cyclic ester compound such as ethylene carbonate, propylene carbonate, γ-butyrolactone or the like, a chain ester compound such as dimethyl carbonate, ethylmethyl carbonate, diethyl carbonate or the like, and a chain ether compound such as 1,2-dimethoxyethane or the like are preferable in case of using in the non-aqueous electrolyte secondary cell. The cyclic ester compound is preferable in a point that the dielectric constant is high and the solubility of the support salt is excellent, while the chain ester and ether compounds are preferable in a point that the viscosity is low and the viscosity of the electrolyte decreases. They may be used alone or in a combination of two or more.

The content of the support salt in the electrolyte is preferably 0.1-1 mol, more preferably 0.2-1 mol per 1 L of the aprotic organic solvent. When the content is less than 0.1 mol, the sufficient electric conduction of the electrolyte can not be ensured and troubles may be caused in the discharge characteristics of the cell, while when it exceeds 1 mol, the viscosity of the non-aqueous electrolyte rises and the sufficient mobility of lithium ion can not be ensured, and hence the sufficient electric conduction of the electrolyte can not be ensured likewise the above case, and finally the resistance of the solution rises and troubles may be caused in the discharge characteristics of the primary cell and in the discharge-charge characteristics of the secondary cell.

To the non-aqueous electrolyte may be added a phosphazene derivative or an isomer of a phosphazene derivative as described in JP-A-6-13108 and JP-A-2002-83628. In this case, the risk of fire-ignition of the electrolyte is reduced in addition that the separator is incombustible, so that the risk of ignition or the like of the non-aqueous electrolyte cell can be reduced surely.

The following examples are given in illustration of the invention and are not intended as limitations thereof.

EXAMPLE 1

Preparation of Separator

A separator for non-aqueous electrolyte cell is prepared by the wet process. At the first step, 25 parts by mass of a ultrahigh molecular weight polyethylene powder having a weight average molecular weight of 2,000,000, 0.3 part by mass of a phosphazene derivative A and 75 parts by mass of stearyl alcohol are fed to a biaxial extrusion machine of 50 mmφ, kneaded at 200° C., continuously extruded through an inflation die having a die diameter of 40 mm, taken up at a take-up rate of 10 mm/min (die temperature: 170° C., draft ratio Dr: 17.6), and melt-deformed at a blow ratio (BUR) of 5.5 to obtain a sheet having a thickness of 52 μm. This sheet is immersed in isopropyl alcohol of 60° C., extracted with stearyl alcohol and subjected to a heat treatment through heating pinch rolls having a surface temperature of 125° C. to obtain a polyethylene microporous film of 38 μm. Moreover, the phosphazene derivative A is synthesized by the following method.

Synthesis Method of Phosphazene Derivative A

A compound of the formula (I), in which $X^1$ is represented by the formula (VIII) and all of $R^1$-$R^3$ and $R^{10}$-$R^{11}$ are Cl and all of $Y^1$-$Y^3$ and $Y^{10}$-$Y^{11}$ are single bond and Z is oxygen, is reacted with sodium ethoxide in a solvent of toluene under a temperature condition of −40° C. and subjected to a molecular distillation to obtain a purified phosphazene derivative A. The chemical formula of the phosphazene derivative A is shown below.

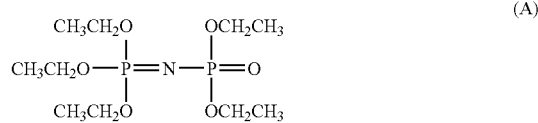

(A)

The resulting separator is kept at 150° C. for 3 hours to evaluate a thermal stability. Also, the evaluation of heat runaway of the separator is carried out by the following method. Furthermore, the porosity is calculated from skeletal density, coating mass and thickness of the separator. The results are shown in Table 1.

Evaluation of Thermal Stability

The combustion length and combustion time of a flame ignited under an atmosphere environment are measured and evaluated by a method arranging UL94HB method of UL (Underwriting Laboratory) standard. At this time, the ignitability, combustibility, formation of carbide and phenomenon in secondary ignition are also observed. Concretely, the evaluation of the separator is carried out by preparing a test piece of 127 mm×12.7 mm based on the UL test standard. The evaluation standards of incombustibility, flame retardance, self-extinguishing property, combustibility are shown below.

Evaluation of Incombustibility

A case that no ignition is caused by adding a test flame (combustion length: 0 mm) is evaluated as an incombustibility.

Evaluation of Flame Retardance

A case that the ignited flame does not reach to a line of 25 mm of a device and no ignition is observed in an objective fallen from net is evaluated as a flame retardance.

Evaluation of Self-extinguishing Property

A case that the ignited flame extinguishes between lines of from 25 to 100 mm and no ignition is observed in an objective fallen from net is evaluated as a self-extinguishing property.

Evaluation of Combustibility

A case that the ignited flame exceeds over a line of 100 mm is evaluated as a combustibility.

Evaluation of Thermal Runaway

The test is carried out by a method arranging an environment test of JIS C8513 (safety of lithium primary cell) 6.2.2.11 or F-1 thermal misapplication test. That is, the cell to be tested is placed in a thermostatic chamber and the temperature of the thermostatic chamber is raised at a rate of 5° C./min up to 150±2° C. With respect to conditions that the cell is kept at this temperature for 10 minutes and for 30 minutes, respectively, a case that the explosion or ignition of the cell is caused is shown by X, and a case that no explosion or ignition of the cell is caused is shown by ○.

Preparation of Lithium Primary Cell

A lithium primary cell of CR2016 type is prepared by using the above separator. A positive electrode is prepared by mixing and kneading manganese dioxide (EMD, made by Mitsui Mining Co., Ltd.), acetylene black and polytetrafluoroethylene (PTFE) at a ratio of 8:1:1 (by mass), coating the kneaded mass With a doctor blade, drying through hot air (100-120° C.) and punching out through punching machine of 16 mmφ. Moreover, mass of the positive electrode is 20 mg. Also, a lithium foil (thickness: 0.5 mm) punched out into 16 mmφ is used as a negative electrode, and a nickel foil is used as a current collector. Further, an electrolyte is prepared by dissolving $LiBF_4$ into γ-butyrolactone (GBL) at a concentration of 0.75 mol/L.

With respect to the thus obtained lithium primary cell, initial cell characteristics at 25° C. (voltage, internal resistance) are measured, and thereafter average discharge potential and discharge capacity at room temperature are measured by the following evaluation methods.

Evaluation of Average Discharge Potential

In a discharge curve obtained by discharging at the positive electrode under a condition of 0.2 C, a potential when the curve is maintained at flat state is evaluated as an average discharge potential.

Evaluation of Discharge Capacity at Room Temperature

The discharge capacity at room temperature is measured by discharging the cell in an atmosphere of 25° C. at a constant current of 1 mA (0.2 C) up to 1.5 V (lower limit voltage).

Preparation of Lithium Secondary Cell

A size AA lithium secondary cell is prepared by using the above separator as follows. At first, a thin-layer positive electrode sheet having a thickness of 100 μm and a width of 40 mm is prepared by adding 10 parts by mass of acetylene black and 10 parts by mass of polytetrafluoroethylene (PTFE) to 100 parts by mass of $LiCoO_2$ (made by Nippon Kagaku Kogyo Co., Ltd.), kneading them in an organic solvent (mixed solvent of 50/50 volume % of ethyl acetate and ethanol), and rolling through rollers. Then, an aluminum foil (current collector) of 25 μm in thickness coated on a surface with a conductive adhesive is sandwiched between two obtained positive electrode sheets, and a lithium metal foil having a thickness of 150 μm is piled through the above separator, which are wound up to prepare a cylindrical electrode. A length of the positive electrode in the cylindrical electrode is about 260 mm. An electrolyte is prepared by dissolving $LiBF_4$ (support salt) into a mixed solution of 50 volume % of diethyl carbonate (DEC) and 50 volume % of ethylene carbonate (EC) at a concentration of 0.75.mol/L. The electrolyte is poured into the cylindrical electrode and sealed to prepare a size AA lithium secondary cell.

With respect to the thus obtained lithium secondary cell, the open-circuit potential (self-discharge characteristic) and average discharge potential when the cell is stored at an open-circuit state at 25° C. for 10 days after the charge to 4.2 V are measured, and further the discharge-recharge cycle characteristic is measured and evaluated by the following evaluation method. The results are shown in Table 2.

Evaluation of Discharge-recharge Cycle Characteristic

The cell is repeatedly subjected to discharge-recharge 50 cycles in an atmosphere of 25° C. under conditions that an upper limit voltage is 4.2 V, a lower limit voltage is 3.0 V, a discharge current is 100 mA and a recharge current is 50 mA, and the initial discharge-recharge capacity and the discharge-recharge capacity after 50 cycles are measured. The ratio of each discharge capacity when the initial discharge capacity of Conventional Example 1 is 1 is shown in Table 2.

EXAMPLES 2-8 AND CONVENTIONAL EXAMPLE

A separator is prepared in the same manner as in Example 1 from a polymer added with an amount of a phosphazene derivative added as shown in Table 1. In this case, phosphazene derivative B, phosphazene derivative C and phosphazene derivative D are synthesized by the following methods.

Synthesis of Phosphazene Derivative B

A purified phosphazene derivative B is obtained by reacting phosphorus trifluoride dichloride ($PCl_2F_3$) with diethyl phosphorylamide in the absence of a solvent and subjecting to a molecular distillation. The chemical formula of the phosphazene derivative B is shown below.

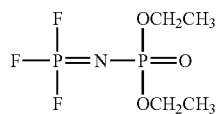

(B)

Synthesis of Phosphazene Derivative C

A compound of the formula (I), in which $X^1$ is represented by the formula (IX) and all of $R^1$-$R^3$ are fluorine and $R^{12}$ is methyl group and all of $Y^1$-$Y^3$ and $Y^{12}$ are single bond, is reacting phosphorus trifluoride dichloride ($PCl_2F_3$) with methane sulfonamide in the absence of a solvent. Then, this compound is reacted with pyrrolidine at room temperature in a solvent of toluene and subjected to a molecular distillation to obtain a purified phosphazene derivative C. The chemical formula of the phosphazene derivative C is shown below.

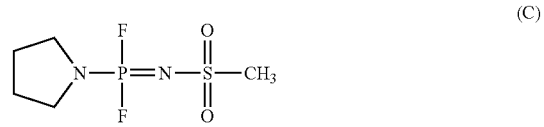

(C)

Synthesis of Phosphazene Derivative D

A compound of the formula (I), in which $X^1$ is acetyl group (—$COCH_3$) and all of $R^1$-$R^3$ are fluorine and all of $Y^1$-$Y^3$ are single bond, is obtained by reacting phosphorus trifluoride dichloride ($PCl_2F_3$) with acetoamide in the absence of a solvent at room temperature. Then, this compound is added with sodium phenoxide in a solvent of acetonitrile under a temperature condition of −40° C. and subjected to a molecular distillation to obtain a purified phosphazene derivative D. The chemical formula of the phosphazene derivative D is shown below.

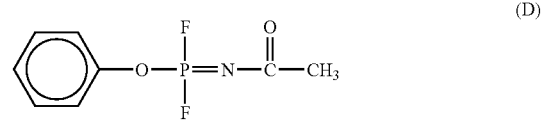

(D)

Also, a phosphazene derivative E is a cyclic phosphazene derivative of the formula (II), in which n is 3 and one of six $R^4$s is phenoxy group and the remaining five are fluorine; a phosphazene derivative F is a cyclic phosphazene derivative of the formula (II), in which n is 3 and all of $R^4$s are methoxy group; a phosphazene derivative G is a cyclic phosphazene derivative of the formula (II), in which n is 3 and all of $R^4$s are phenoxy group; a phosphazene derivative H is represented by the following formula (H):

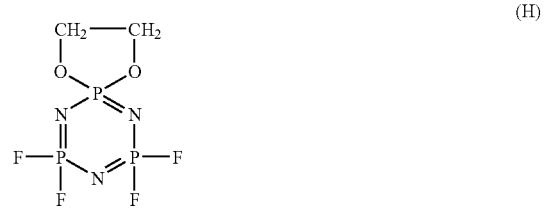

(H)

As a conventional example, a separator is prepared in the same manner as in Example 1 except that the phosphazene derivative is not added. With respect to the thus obtained separator, the thermal stability and thermal runaway are evaluated and the porosity is measured and calculated in the same manner as in Example 1.

Furthermore, a lithium primary cell provided with this separator is prepared in the same manner as in Example 1, and the initial cell characteristics (voltage, internal resistance), average discharge potential and discharge capacity at room temperature are measured. The results are shown in Table 1. Moreover, a lithium secondary cell provided with the separator is prepared in the same manner as in Example 1, and the open circuit potential, average discharge potential and discharge-recharge cycle characteristic are measured and evaluated. The results are shown in Table 2.

TABLE 1

| | Polymer (part by mass) | Phosphazene (parts by mass) | Evaluation of thermal stability | Evaluation of thermal runaway keeping for 10 minutes | Evaluation of thermal runaway keeping for 30 minutes | Thickness of separator (μm) | Porosity (%) | Initial potential (V) | Internal resistance (Ω) | Average discharge potential (V) | Discharge capacity at room temperature (mAh/g) |
|---|---|---|---|---|---|---|---|---|---|---|---|
| Conventional Example 1 | polyethylene 25 | — | combustibility | x | x | 38 | 40 | 3.55 | 13.2 | 2.65 | 238 |
| Example 1 | polyethylene 25 | phosphazene A 0.3 | incombustibility | ○ | ○ | 38 | 40 | 3.65 | 12.6 | 2.63 | 234 |
| Example 2 | polyethylene 25 | phosphazene B 0.3 | incombustibility | ○ | ○ | 38 | 40 | 3.63 | 13.0 | 2.66 | 240 |
| Example 3 | polyethylene 25 | phosphazene C 0.3 | incombustibility | ○ | ○ | 38 | 40 | 3.62 | 10.8 | 2.65 | 245 |
| Example 4 | polyethylene 25 | phosphazene D 0.3 | incombustibility | ○ | ○ | 38 | 40 | 3.66 | 11.2 | 2.63 | 248 |
| Example 5 | polyethylene 25 | phosphazene E 0.3 | incombustibility | ○ | ○ | 38 | 40 | 3.64 | 13.2 | 2.64 | 246 |
| Example 6 | polyethylene 25 | phosphazene F 0.3 | incombustibility | ○ | ○ | 38 | 40 | 3.61 | 13.9 | 2.65 | 243 |
| Example 7 | polyethylene 35 | phosphazene G 0.3 | incombustibility | ○ | ○ | 38 | 40 | 3.62 | 13.0 | 2.65 | 241 |
| Example 8 | polyethylene 25 | phosphazene H 0.3 | incombustibility | ○ | ○ | 38 | 40 | 3.65 | 11.6 | 2.64 | 240 |

TABLE 2

| | Polymer (part by mass) | Phosphazene (part by mass) | Cell characteristics of secondary cell | | | |
|---|---|---|---|---|---|---|
| | | | Open circuit potential (V) | Average discharge potential (V) | Initial discharge capacity | Cycle characteristics Discharge capacity after 50 cycles |
| Conventional Example 1 | polyethylene 25 | — | 4.02 | 3.45 | 1.00 | 0.85 |
| Example 1 | polyethylene 25 | phosphazene A 0.3 | 4.05 | 3.46 | 1.03 | 0.89 |
| Example 2 | polyethylene 25 | phosphazene B 0.3 | 4.10 | 3.48 | 1.05 | 0.92 |
| Example 3 | polyethylene 25 | phosphazene C 0.3 | 4.12 | 3.46 | 1.03 | 0.88 |
| Example 4 | polyethylene 25 | phosphazene D 0.3 | 4.08 | 3.45 | 1.01 | 0.89 |
| Example 5 | polyethylene 25 | phosphazene E 0.3 | 4.05 | 3.45 | 1.03 | 0.90 |
| Example 6 | polyethylene 25 | phosphazene F 0.3 | 4.08 | 3.48 | 1.03 | 0.94 |
| Example 7 | polyethylene 25 | phosphazene G 0.3 | 4.12 | 3.50 | 1.05 | 0.95 |
| Example 8 | polyethylene 25 | phosphazene H 0.3 | 4.10 | 3.50 | 1.00 | 0.92 |

As seen from Table 1, the separators of Examples 1-8 are good in the thermal stability and do not cause the thermal runaway, and the risk of combustion is considerably reduced. On the other hand, the separator of the conventional example is poor in the thermal stability as compared with those of the examples and also causes the thermal runaway, and also the risk of combustion is high. As seen from Tables 1 and 2, the lithium primary cells (non-aqueous electrolyte secondary cell) each provided with each separator of Examples 1-8 do not lower the cell characteristics as compared with the cell of the conventional example and can be put into practical use.

INDUSTRIAL APPLICABILITY

According to the invention, there can be provided the incombustible separator for the non-aqueous electrolyte cell made of the microporous film formed by adding the phosphazene derivative and/or the isomer of the phosphazene derivative to the polymer. Since the separator is incombustible, if the non-aqueous electrolyte cell becomes high temperature, the risk of burning the separator itself is considerably reduced. Also, the non-aqueous electrolyte cell provided with the separator does not damage the cell characteristics as compared with the conventional non-aqueous electrolyte cell.

What is claimed is:

1. A separator for a non-aqueous electrolyte cell comprising a microporous film formed by adding a phosphazene derivative and/or an isomer of a phosphazene derivative to a polymer,
wherein the phosphazene derivative is a phosphazene derivative having a viscosity at 25° C. of not more than 300 mPa.s (300 cP) and represented by the following formula (I) or (II):

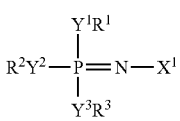

(I)

(wherein $R^1$, $R^2$ and $R^3$ are independently a monovalent substituent or a halogen element; $X^1$ is a substituent containing at least one element selected from the group consisting of carbon, silicon, germanium, tin, nitrogen, phosphorus, arsenic, antimony, bismuth, oxygen, sulfur, selenium, tellurium and polonium; and $Y^1$, $Y^2$ and $Y^3$ are independently a bivalent connecting group, a bivalent element or a single bond);

$$(NPR^4{}_2)_n \qquad (II)$$

(wherein $R^4$ is independently a monovalent substituent or a halogen element and n is 3-15), and wherein the phosphazene derivative of the formula (II) is a phosphazene derivative represented by the following formula (III):

$$(NPF_2)_n \qquad (III)$$

(wherein n is 3-13).

2. A separator for a non-aqueous electrolyte cell comprising a microporous film formed b adding a phosphazene derivative and/or an isomer of a phosphazene derivative to a polymer, wherein the phosphazene derivative is a phosphazene derivative having a viscosity at 25° C. of not more than 300 mPa.s (300 cP) and represented by the following formula (I) or (II):

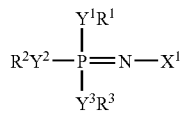

(I)

(wherein $R^1$, $R^2$ and $R^3$ are independently a monovalent substituent or a halogen element; $X^1$ is a substituent containing at least one element selected from the group consisting of carbon, silicon, germanium, tin, nitrogen, phosphorus, arsenic, antimony, bismuth, oxygen, sulfur, selenium, tellurium and polonium; and $Y^1$, $Y^2$ and $Y^3$ are independently a bivalent connecting group, a bivalent element or a single bond);

$$(NPR^4{}_2)_n \qquad (II)$$

(wherein $R^4$ is independently a monovalent substituent or a halogen element; and n is 3-15), and wherein the phosphazene derivative of the formula (II) is a phosphazene derivative represented by the following formula (IV):

$$(NPR^5{}_2)_n \qquad (IV)$$

(wherein $R^5$ is independently a monovalent substituent or fluorine, and at least one of all $R^5$s is a fluorine containing monovalent substituent or fluorine; and n is 3-8, provided that all $R^5$s are not fluorine).

3. A separator for a non-aqueous electrolyte cell comprising a microporous film formed by adding a phosphazene derivative and/or an isomer of a phosphazene derivative to a polymer, wherein the isomer of the phosphazene derivative is an isomer represented by the following formula (VI) and of a phosphazene derivative represented by the following formula (VII):

(VI)

(VII)

(in the formulae (VI) and (VII), $R^7$, $R^8$ and $R^9$ are independently a monovalent substituent or a halogen element; $X^2$ is a substituent containing at least one element selected from the group consisting of carbon, silicon, germanium, tin, nitrogen, phosphorus, arsenic, antimony, bismuth, oxygen, sulfur, selenium, tellurium and polonium; and $Y^7$ and $Y^8$ are independently a bivalent connecting group, a bivalent element or a single bond).

* * * * *